United States Patent [19]
Prescott et al.

[11] Patent Number: 6,019,147
[45] Date of Patent: Feb. 1, 2000

[54] TRANSFER APPARATUS FOR BULK SOLIDS

[75] Inventors: James K. Prescott, Shrewsbury, Mass.; Scott A. Clement, San Luis Obispo; Richard A. Winkelpleck, Arroyo Grande, both of Calif.

[73] Assignee: Jenike & Johanson, Inc., Westford, Mass.

[21] Appl. No.: 09/178,656

[22] Filed: Oct. 26, 1998

[51] Int. Cl.[7] .................................................. B65G 65/00
[52] U.S. Cl. ..................... 141/114; 141/263; 141/284; 141/388; 193/25 C; 414/291; 414/295; 414/299; 198/524
[58] Field of Search ................................. 141/114, 250, 141/251, 263, 266, 284, 382, 388; 193/25 C; 414/291, 293, 295, 299, 397; 198/524, 536

[56] References Cited

U.S. PATENT DOCUMENTS

| | | | |
|---|---|---|---|
| 1,114,454 | 10/1914 | Petrow et al. | 198/536 |
| 2,365,240 | 12/1944 | Arnold | 414/295 |
| 3,658,101 | 4/1972 | Waldron | 141/284 |
| 3,738,464 | 6/1973 | Ortlip et al. | 193/25 C |
| 3,799,223 | 3/1974 | Feneziani | 141/388 |
| 4,061,221 | 12/1977 | Higashinaka et al. | 198/524 |
| 4,182,591 | 1/1980 | Stanelle | 414/291 |
| 4,225,033 | 9/1980 | Fukagai et al. | 198/524 |
| 4,492,294 | 1/1985 | Ball | 193/25 C |
| 4,727,913 | 3/1988 | Bliss | 141/7 |
| 4,738,287 | 4/1988 | Klinkel | 141/114 |
| 4,942,953 | 7/1990 | Chefson | 193/25 C |
| 5,332,012 | 7/1994 | Svendsen | 141/93 |
| 5,601,181 | 2/1997 | Lindhorst | 198/536 |
| 5,697,408 | 12/1997 | Reeves | 141/284 |

OTHER PUBLICATIONS

Zanchetta & C. s.r.l., "Zanchetta Shuttle System" cover and three pages.

*Primary Examiner*—J. Casimer Jacyna
*Attorney, Agent, or Firm*—Lahive & Cockfield, LLP

[57] ABSTRACT

Apparatus having a let-down tube for dust free gravity transfer of bulk solids between upper and lower containers. A spool engageable with a discharge opening on the upper container has a lower end for slidably receiving an end of the let-down tube, the other end of which falls into the lower container. As solids flow from the upper to the lower container through the tube, the tube is progressively drawn up over the lower end of the spool, then longitudinally cut into sheets which are separately rolled up. The let-down tube permits transfer of the solids without demixing or aeration.

8 Claims, 7 Drawing Sheets

TRANSFER APPARATUS FOR BULK SOLIDS

BACKGROUND OF THE INVENTION

This invention relates generally to apparatus for industrial processing of bulk solids, i.e., powders, granulations and other particulate solid materials, including mixtures of such materials comprising solids of differing compositions and sizes. More particularly, the invention relates to apparatus for transferring such solids from one container to another, for example from a blender or bin to a portable bin, drum or container for transfer to another location, or for storage.

Under certain circumstances, bulk solid transfer may result in degradation of the quality of the solids including aeration of the material and segregation, that is, demixing of blended mixtures, with the consequent loss of uniformity of the content in the receiving container. Moreover, when the solids comprise fine or pulverulent materials, dust may be generated with exposure hazards to persons in the vicinity, as well as cleaning and other maintenance difficulties.

An example of the foregoing problems arises in the pharmaceutical industry in the manufacture of solid dosage forms of blended ingredients such as tablets or capsules. Typically, the ingredients are blended by known means such as tumbling or recirculation, and are then required to be transferred from the blender to a portable bin or drum from which they are later discharged into a tablet press or other device. Typical industry practice is to mate the outlet of a blender to the inlet of a bin, or simply to put the opening of the bin under the blender without a fixed connection. In either case, as the bin is filled material falls through the air and dust is generated.

In other industries such as the filling of ships and the forming of stockpiles, structures are provided in the form of let-down chutes extending between the two containers. Typically, this involves a fabric tube with a conical bottom, the latter in some cases comprising a series of cones which stack together, to form a contained path for the falling material. As the pile forms the fixture is raised by pulling up on cables connected to the bottom cone. Apparatus of that type is generally unacceptable in the pharmaceutical industry for at least four reasons. First, in the pharmaceutical industry all equipment is often completely cleaned after each batch has been blended and transferred. In cleaning, hidden surfaces present a particular problem for acceptable maintenance. A second objection is that these methods require the use of cables to pull up the device. To be certain that no foreign material enters the powder or other bulk solids, cables including those of metal composition are not allowed to enter the receiving container, even if they remain attached to the let-down fixture. Thirdly, let-down fixtures generally take up significant head room, frequently unavailable in existing facilities. Fourthly, these devices allow free-fall of the material while the tube is being initially filled with the material.

A principal object of this invention is to provide means for transfer of bulk solids that eliminate the unconfined fall of the solids from the discharge opening of the upper container to the top of the pile in the lower container, thereby eliminating the generation of dust, aeration of the material and segregation of blends of particles having differing physical characteristics.

A second object of the invention is to provide let-down means that avoid contamination of the material in the receiving container.

A third object is to provide let-down means that may be easily cleaned and maintained in use.

BRIEF SUMMARY OF THE INVENTION

With the above and other objects in view, as will be apparent from the following description, the features of this invention include the use of a flexible let-down tube or sock through which the bulk solids flow by gravity from the upper blender or other container to the top of the pile in the receiving container. Thus the solids are fully contained by the tube and are not exposed to aeration. Also, the confinement of the solids prevents the generation of dust.

The let-down tube is supported on a spool having its upper end adapted for a sealed fit to the discharge opening on the upper container. The tube fits slidably over the lower end of the spool, the tube and spool also forming a seal to prevent escape of the contained solids.

A plurality of cutters are annularly spaced about the spool in position to cut the tube received over its lower end into sheets. Means are provided to draw the sheets from the cutters to elevate the lower end of the let-down tube progressively as the solids fill the lower container.

Means are provided to transport the spool into position relative to the filling opening on the lower container, thereby permitting an end of the tube to descend into the lower container. Means are employed for discharging the solids from the upper container into the let-down tube as it descends to the lower end of the receiving space.

Other features of the invention comprise structures and arrangements of the parts for facilitating the foregoing operation as hereinafter more fully illustrated and described.

DESCRIPTION

Figure 1:
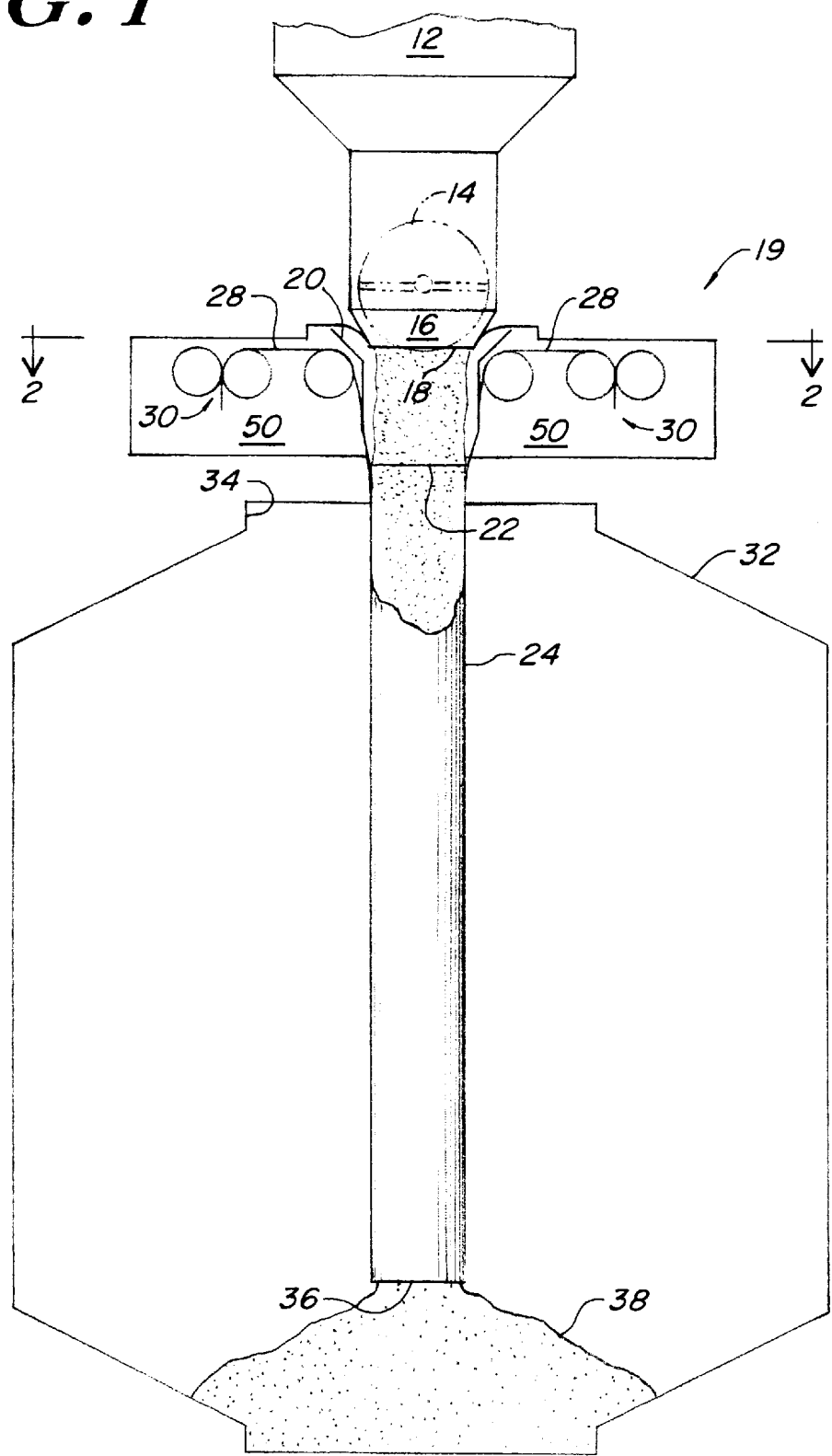
FIG. 1 is an elevation schematically illustrating the general operation of a presently preferred embodiment of the invention during the transfer of bulk solids between containers, the cutters being omitted from the drawing and shown in other figures.
Figure 2:
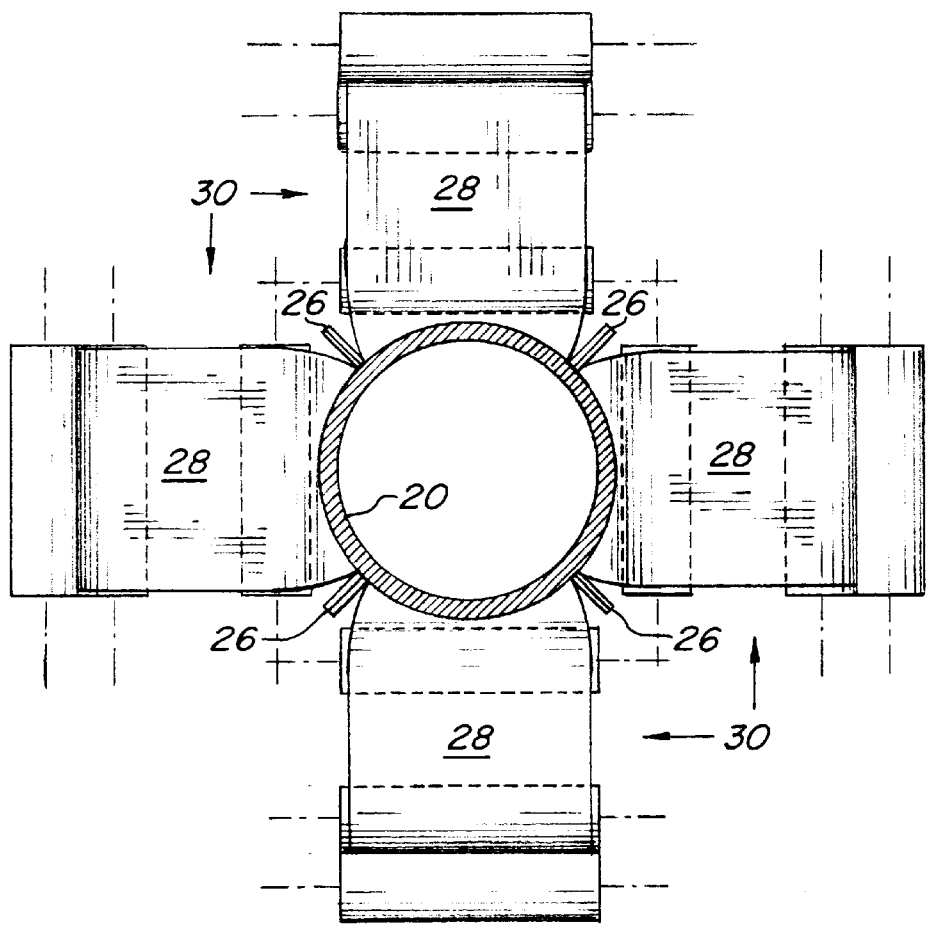
FIG. 2 is a partial plan view of the transfer apparatus taken on line 2—2 of FIG. 1, showing the cutters.
Figure 4:
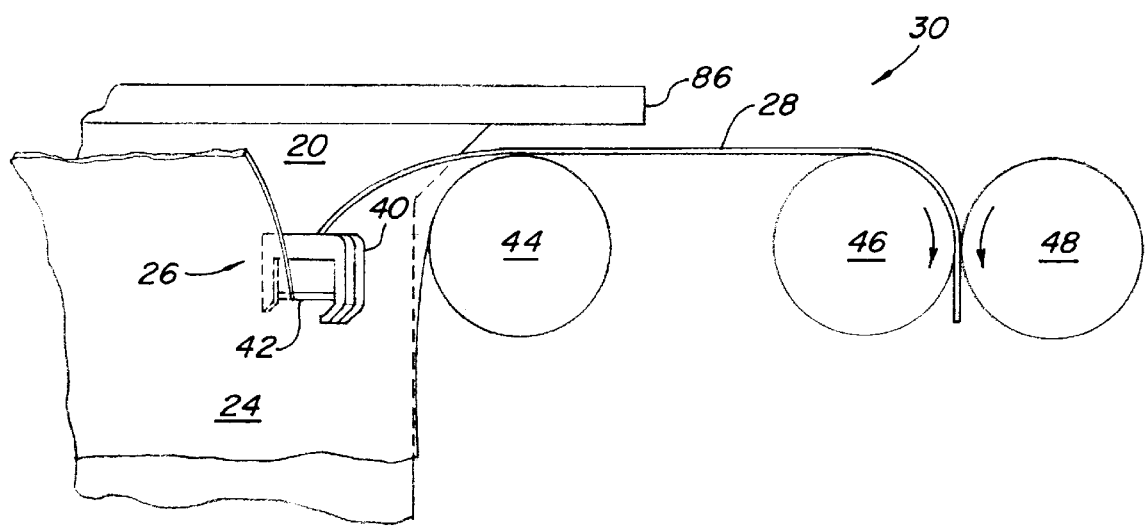
FIG. 4 is a detail view showing the operation of the cutters and take-up rolls.

The drawings illustrate a presently preferred embodiment of the invention in which only the let-down tube enters the receiving container. Referring to FIGS. 1, 2 and 4, a blender or bin comprising an upper container 12 is fitted with suitable valve means 14, in this embodiment a butterfly valve, and a reducing cone 16 having a discharge opening 18. Transfer apparatus shown generally at 19 includes a spool 20 here shown in schematic form, having an upper end provided with means hereinafter described for fitting to the discharge opening 18. The spool has a tapered lower end 22 adapted for fittingly and slidingly receiving a flexible tube 24 over the outer surface of the spool. A plurality of cutters 26 (FIG. 2) preferably in the form of detachable stainless steel razor blades are mounted on the spool above its lower end 22 and evenly spaced about the periphery of the spool. The cutters are oriented to produce longitudinal slits in the tube 24. In this embodiment there are four cutters 26 producing four sheets 28 extending from the cutters mutually at right angles to respective take-up roll mechanisms each generally shown at 30. However, it will be apparent that more or less than four cutters may be provided and uniformly spaced about the periphery of the spool, each provided with a separate take-up mechanism.

A portable bin, drum or other container for the transfer or storage of bulk solids comprises a lower container 32 having a filling opening 34. An open end 36 of the let-down tube 24 is shown extending to the top of a pile 38 of the bulk solids as the latter are beginning to fill the lower container 32. As shown, the solids are fully contained in their descent by gravity from the upper container 12 to the top of the pile 38 and the solids completely fill the tube 24, thereby preventing aeration of the solids and the generation of dust that may otherwise escape from the filling opening 34 of the lower container. Also, since the moving solids remain confined, the tendency to segregate or demix is prevented. In this embodiment, the only element of the transfer apparatus 19 that enters the interior space of the receiving container is the tube 24.

The tube or sock 24 is preferably formed of an expendable, extruded, electrically conductive, stretchable plastic in "lay flat" form and comprises, for example, a material such polypropylene or polyethylene of non-fibrous composition. Electrical conductivity may be imparted by the incorporation of an electrically conductive additive such as carbon powder, copper fibers or the like. These additives prevent the buildup of static electrical charges which might cause explosion of leakage dust. Alternatively, other forms of seamed or unseamed, fibrous or non-fibrous, woven or nonwoven or knitted materials may be used as the particular application permits.

As shown in FIG. 4, the tube 24 is drawn up over the lower, preferably tapered end 22 of the spool 20 by the take-up means 30 (FIG. 1). The cutters 26 comprise brackets 40 mounted on the spool 20 (FIGS. 2 and 4), each supporting a detachable and replaceable razor blade 42. The razor blades divide the tube 24 into the sheets 28, each of which is drawn over a guide roll 44 and enters the nip between a pair of take-up pinch rolls 46 and 48. The rolls 46 and 48 may be lagged or covered with a suitable rubber-like material to increase friction with the sheet 28. As hereinafter further described in relation to FIGS. 3 and 7, the roll 48 has a fixed axis and the roll 46 has a movable axis for selectively opening and closing the nip between the rolls.

Figure 5:
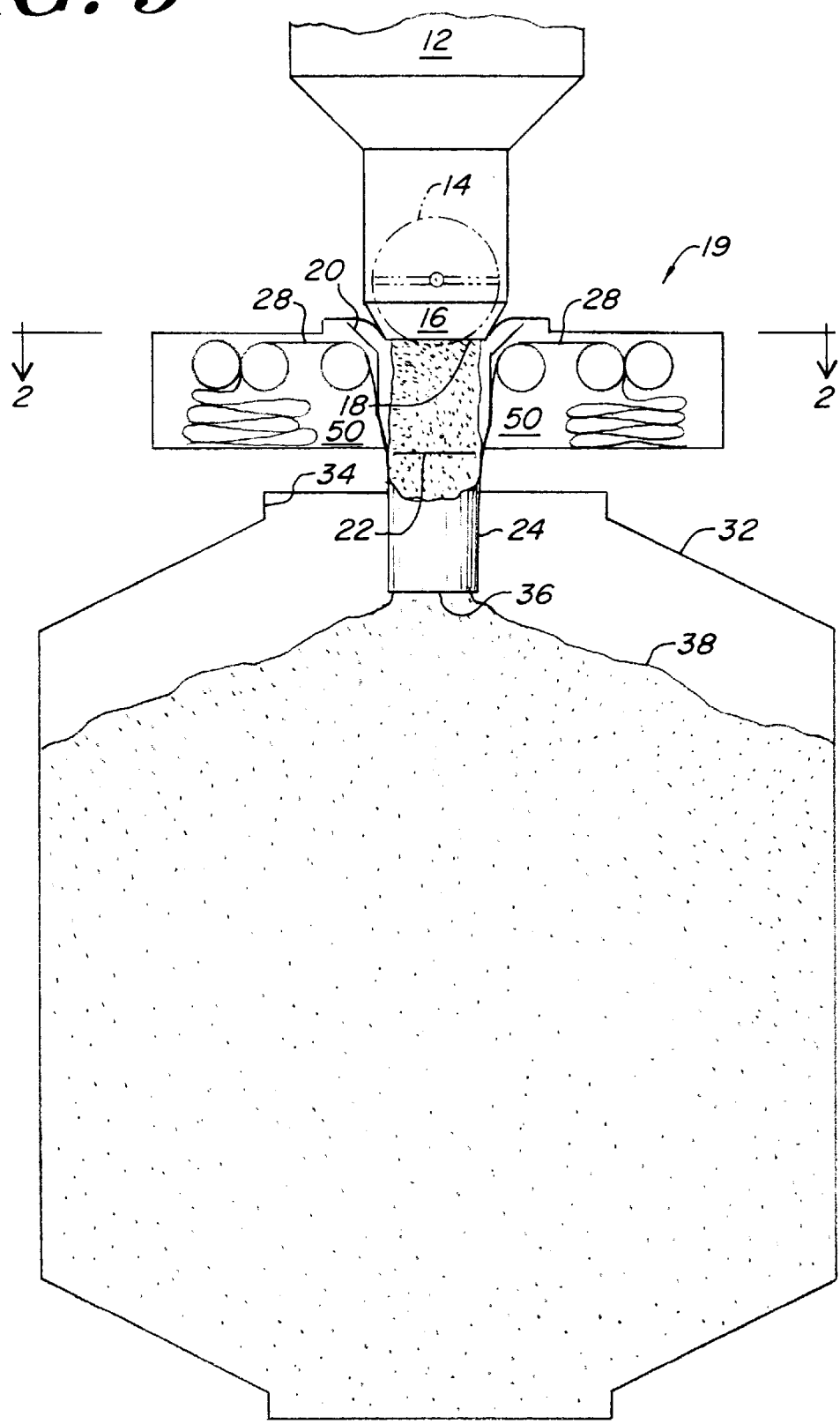
FIG. 5 is a schematic elevation similar to FIG. 1 showing the let-down tube in an upper filling position.
Figure 6:
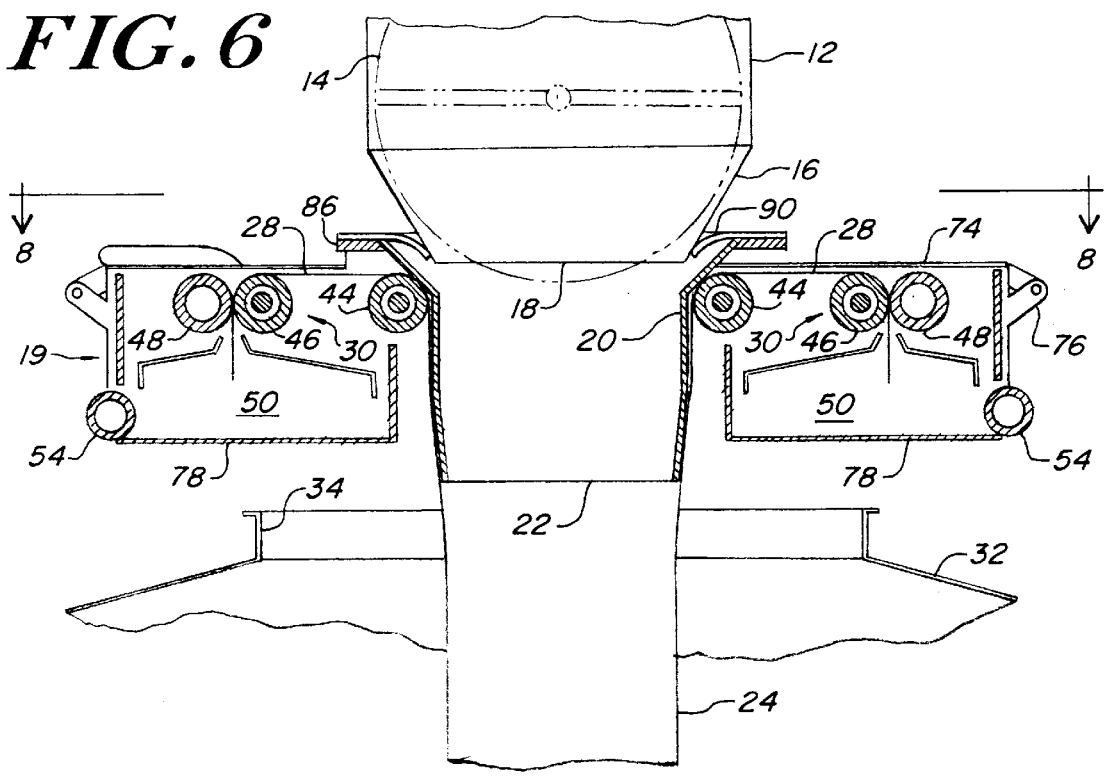
FIG. 6 is an elevation partially in section showing details of the transfer device.

As shown in FIG. 5, as the filling of the lower container 32 progresses, the top of the pile 38 rises. The lower end 36 of the tube 24 is progressively drawn upwardly, maintaining contact or near contact with the top of the pile 38, and the sheets 28 are progressively accumulated in a containment area 50 of the transfer apparatus 19. When the filling of the lower container 32 is completed, the transfer apparatus with the tube 24 is withdrawn from the container 32 and the sheets 28 are removed therefrom and disposed of as waste.

Figure 10:
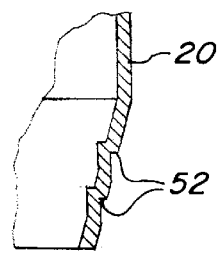
FIG. 10 is a fragmentary elevation in section showing grooves in the spool.

In order to maintain a tight seal between the tube 24 and the spool 20, the diameter of the latter is preferably slightly larger than that of the unstretched tube 24, thus causing the latter to be stretched as it is slidably drawn upwardly over the lower tapered end 22 of the spool, the latter being preferably of cone shape and provided with annular grooves 52 as illustrated in FIG. 10 to improve the seal between the mutually sliding elements.

The structure of the transfer apparatus 19 is described in greater detail with reference to FIGS. 3, 6, 7 and 8. The cutters 26 are omitted in FIG. 6 and shown in FIG. 8.

The transfer apparatus 19 is supported on a square frame 54 comprised of tubular stainless steel sides (FIG. 8) welded together at mitered corners. The frame 54 may be supported on a wheeled stand (not shown) constructed for rolling the apparatus 19 over the container 32 into a position aligned with the container 12, and with pneumatic means to lift the aligned apparatus 19 into engagement with the reducing cone 16.

A main frame 56 comprises four stainless steel arms each formed at right angles with the ends adapted to rest on the tubular frame 54. The arms support the bearings for the rolls 44, 46 and 48 of the respective take-up means 30. The axes of the rolls 48 are fixed in the frame 56 and mutually connected to a gear drive assembly 58. The assembly 58 comprises a motor 60, a right angle drive reducer 62, an adapter 64, a three-way gear box 66, two drive shafts 68 extending from the gear box 66, two-way gear boxes 70 each connected with one of said shafts, and shafts 72 each extending at right angles from one of the last-mentioned gear boxes. The shafts 68 and 72 support and drive the rolls 48.

Each of the take-up assemblies is provided with a top cover 74 hinged on brackets 76 (FIG. 6), and a bottom cover 78 preferably also provided with suitable hinges (not shown) for removal of the sheets 28 accumulated in the respective containment areas 50. The frame 56 and covers 74 and 78 permit the take-up rolls and the accumulation areas to be entirely enclosed, avoiding the release of solids that may adhere to the sheets 28 after exposure to the solids.

Figure 3:
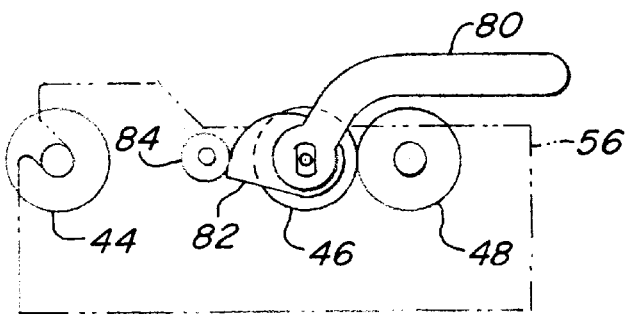
FIG. 3 is a detail view of the release means for the take-up rolls in the closed position.
Figure 7:
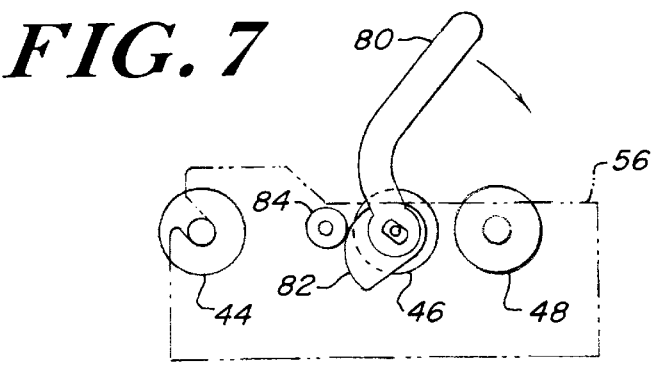
FIG. 7 is an elevation similar to FIG. 3 showing the release means in the open position.
Figure 8:
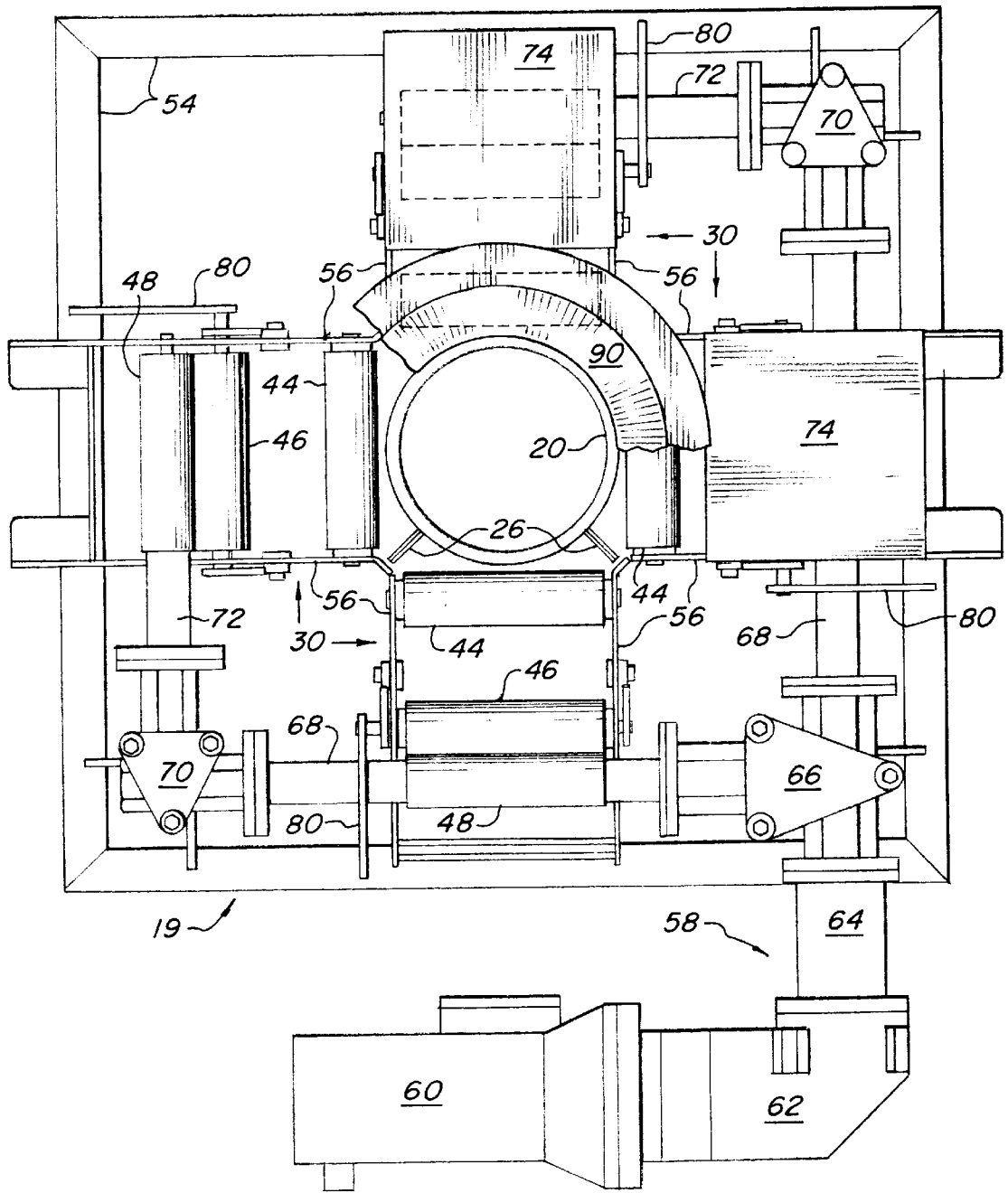
FIG. 8 is a plan view taken on line 8—8 of FIG. 6.

The operation of the release mechanism on the pinch rolls will be evident from FIGS. 3 and 7. The frame 56 is slotted to receive the shaft of the roll 46. A handle 80 with an attached cam 82 is received over this shaft and is rotatable thereon. The cam bears on a roll or post 84. FIG. 3 shows the handle in the lowered position causing the cam 82 to form a nip between the rolls 46 and 48. FIG. 7 shows the handle in the raised position wherein the cam 82 allows the rolls 46 and 48 to separate.

Figure 9:
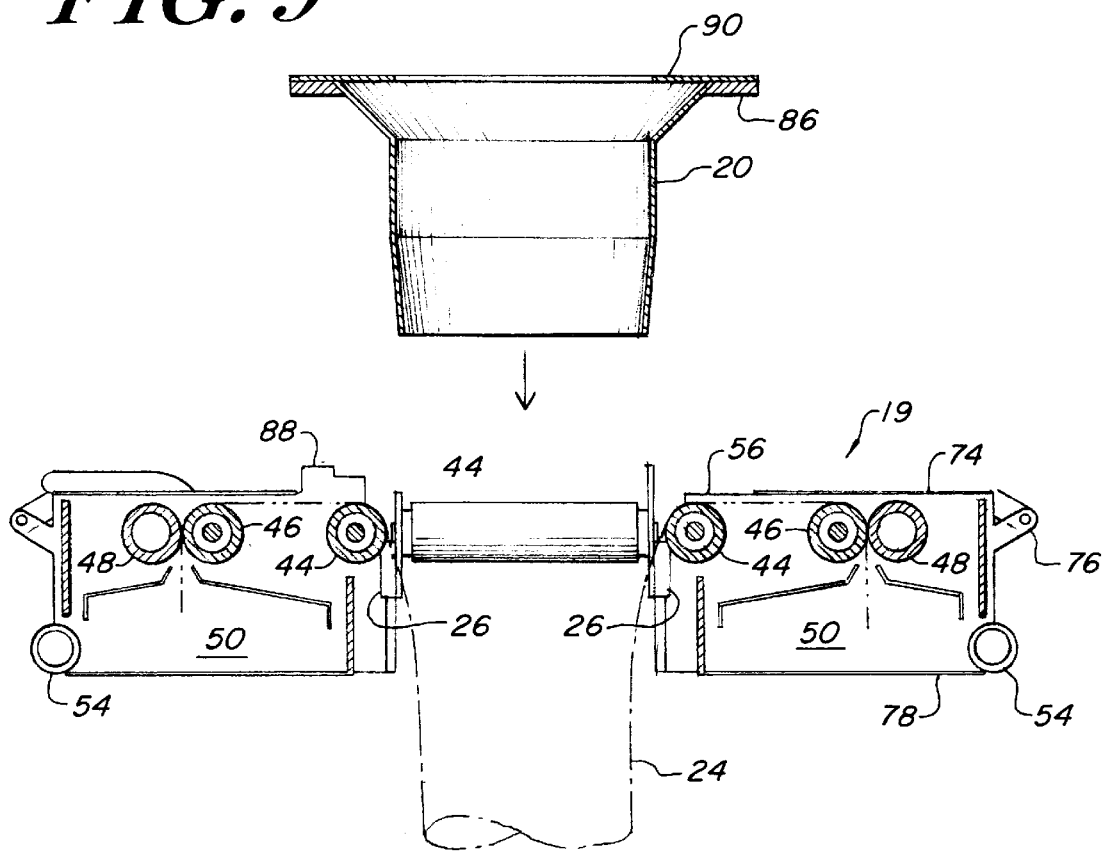
FIG. 9 is an elevation illustrating the assembly of the spool and let-down tube into the transfer apparatus prior to deployment in the receiving container.

In operation, a tube 24 is first cut transversely to an appropriate length and one end is slitted along four longitudinal lines evenly spaced about its periphery to form lead ends of the sheets 28. The tube 24 is then loaded into the transfer apparatus 19 by inserting it down into the square opening through the main frame 56 (FIG. 9), permitting the sheets 28 formed by the cut lines to be passed over the respective guide rolls 44 and between the take-up rolls 46 and 48, the handles of the release means 80 being then in the upper position of FIG. 7.

The spool 20, which is of circular cross section, is then lowered into the frame 56 with the cutters 26 aligned with the longitudinal ends of the cuts in the tube 24. The handles 80 of the release mechanisms are lowered to the position of FIG. 3 after slack between the rolls 44 and 46 has been eliminated by tension applied to the ends of the sheets 28. For convenience, the portion of the tube 24 below the cutters is folded, rolled up or stuffed inside the spool 20 temporarily until the transfer apparatus 19 is later placed in its operative position. The spool 20 is formed with a flange 86 which rests on a shoulder 88 on the frame 56 when the spool is fully inserted in the frame. A circular gasket 90 of flexible rubber-like sheet material is secured to the upper face of the flange 86.

The transfer apparatus 19, mounted upon a suitable frame, is then moved between the containers 12 and 32 and into alignment therewith. After alignment the frame 54 is raised by pneumatic means or otherwise to the position of FIG. 6 with the reducing cone 16 deflecting the gasket 90, forming a seal therewith. The lower end 36 of the tube 24 may be temporarily held closed by a clamp or similar device.

The valve 14 is then opened to allow solids to fill the limited space in the spool above the rolled up, folded or stuffed tube 24 therein. The lower end of the tube is then deployed, dropping down through the filling opening 34 in the container 32 and reaching to the bottom of the container or to the level of any preexisting pile 38 of solids therein. As the tube is being thus deployed, the expanding space within it continually fills with solids from the upper container 12, and the solids are not in free-fall during such deployment. Generation of dust is thereby avoided during both the initial deployment of the tube 24 and thereafter as the lower container 32 is itself filling with the material.

It will be recognized that although the transfer apparatus described herein is provided with a motor 60 for driving the take-up rolls, these rolls can also be operated manually by means of a crank or similar device.

While the presently preferred embodiment of the invention is provided with the take-up roll mechanisms 30 for the sheets 28, other means may be employed for applying tension to the sheets to draw them up through the cutters 26. For example, the sheets may be drawn up in a linear manner rather than by pinch rolls, either manually or by alternative known devices for applying tension to the sheets.

It will also be recognized that the transfer apparatus 19 as described herein can be modified, if desired, for attachment to a cover for the filling opening 34 in the receiving container 32. In such case the structure of the enclosure for the apparatus 19 can be adapted for closing the opening 34, and another suitable aperture can be provided in the container 32 for the escape of air as it is progressively displaced by the solids filling the container.

We claim:

1. Means to transfer bulk solids from an upper container to a lower container comprising, in combination,
    a spool having an upper end adapted for fitting to a discharge opening on the upper container and a lower end adapted for fittingly and slidably receiving a flexible tube over its outer surface,
    a plurality of cutters annularly spaced about the spool in position to cut the tube received over said lower end into sheets,
    means to support the spool in position relative to a filling opening in the lower container to permit an end of said tube to fall into said container,
    means for discharging said solids from said discharge opening through said tube into said lower container, and
    means to draw said sheets from the cutters to elevate said end of the tube progressively as said solids fill the lower container.

2. Means according to claim 1, in which the spool is dimensioned to stretch the tube received over said lower end.

3. Means according to claim 1, in which the spool is supported above and externally of said filling opening.

4. Means according to claim 1, in which said discharge opening comprises a reducing cone and the upper end of the spool has a flexible seal formed with a circular opening annularly engageable with said cone.

5. Means according to claim 1, in which the cutters comprise blades mounted on the spool for longitudinally slicing the tube.

6. Means according to claim 1, in which the means to draw said sheets comprise
    a pair of pinch rolls each adapted for receiving a sheet, and
    a drive train adapted for simultaneously driving said pairs of pinch rolls.

7. Means according to claim 6, in which each pair of pinch rolls comprises a fixed axis roll, a movable axis roll, and release means operable thereon for selectively engaging and releasing the sheet between the rolls.

8. Means according to claim 6, including
    means for accumulating the sheets after passing through the pinch rolls.

* * * * *